United States Patent
Borgerson

(10) Patent No.: US 8,012,059 B2
(45) Date of Patent: Sep. 6, 2011

(54) MULTI-SPEED AUTOMATIC TRANSMISSION

(75) Inventor: James B. Borgerson, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 674 days.

(21) Appl. No.: 12/117,923

(22) Filed: May 9, 2008

(65) Prior Publication Data

US 2008/0300093 A1 Dec. 4, 2008

Related U.S. Application Data

(60) Provisional application No. 60/940,847, filed on May 30, 2007.

(51) Int. Cl.
*F16H 3/44* (2006.01)

(52) U.S. Cl. .................. 475/283; 475/297

(58) Field of Classification Search ............ 475/271, 475/277, 280, 281, 282, 283, 288, 289, 296, 475/297
See application file for complete search history.

(56) References Cited

U.S. PATENT DOCUMENTS

| | | | |
|---|---|---|---|
| 5,879,263 A * | 3/1999 | Haka | 475/276 |
| 6,558,287 B2 | 5/2003 | Hayabuchi et al. | |
| 6,764,426 B2 * | 7/2004 | Usoro et al. | 475/296 |
| 7,101,305 B2 | 9/2006 | Tabata et al. | |
| 7,163,484 B2 | 1/2007 | Klemen | |
| 7,699,741 B2 * | 4/2010 | Hart et al. | 475/271 |
| 7,775,931 B2 * | 8/2010 | Carey et al. | 475/276 |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0009384 A1 * | 1/2008 | Diosi et al. | 475/282 |
| 2008/0009385 A1 * | 1/2008 | Kamm et al. | 475/296 |
| 2008/0015077 A1 * | 1/2008 | Kamm et al. | 475/269 |

\* cited by examiner

*Primary Examiner* — Roger Pang

(57) ABSTRACT

A multiple speed automatic transmission includes an input member, an output member, a plurality of planetary gear sets, a plurality of interconnecting members and a plurality of torque transmitting devices. Each of the plurality of planetary gear sets has a sun gear, a planet carrier with a plurality of planet gears and a ring gear. The torque transmitting devices include three clutches, a conventional first brake and a second brake comprising a parallel combination of an overrunning clutch and a light duty or coast clutch. Eight forward speeds and one reverse speed are achieved by selective engagement of the five torque transmitting devices.

13 Claims, 2 Drawing Sheets

| GEAR STATE | GEAR RATIO | TORQUE TRANSMITTING MECHANISMS | | | | |
|---|---|---|---|---|---|---|
| | | 90 | 92 | 82 | 80 | 84 |
| REV | -3.653 | X | X | | | X |
| N | | O | O | | | |
| 1st | 4.600 | X | X | | X | |
| 2nd | 3.067 | X | X | X | | |
| 3rd | 2.013 | | X | X | X | |
| 4th | 1.600 | | X | X | | X |
| 5th | 1.244 | | X | | X | X |
| 6th | 1.000 | | | X | X | X |
| 7th | 0.848 | X | | | X | X |
| 8th | 0.667 | X | | X | | X |

X = ON, CARRYING TORQUE

O = ON, NOT CARRYING TORQUE

MULTI-SPEED AUTOMATIC TRANSMISSION

CROSS-REFERENCE TO RELATED APPLICATIONS

This application claims the benefit of U.S. Provisional Application No. 60/940,847 filed on May 30, 2007. The disclosure of the above application is incorporated herein by reference.

TECHNICAL FIELD

The invention relates to a multiple speed automatic transmission having both a plurality of planetary gear sets and torque transmitting devices that are selectively engageable to achieve multiple gear ratios.

BACKGROUND

A typical modern multiple speed automatic transmission includes a combination of planetary gear assemblies and selectively engaged friction clutches and to achieve a plurality of gear ratios.

Increasingly demanding economic and performance goals continue to encourage automatic transmission research and development. A result of this effort has been an increase in the number of available forward gears or speed ratios provided by the transmission.

Whereas three and four speed automatic transmissions were once commonplace, considered both suitable and to provide sufficient flexibility and performance, the industry and consumer preference is moving to six, seven and eight speed automatic transmissions.

In such transmissions, the various elements of a plurality of planetary gear assemblies are connected by permanent couplings, selectively connected by clutches and selectively grounded by brakes. Specific combinations of the clutches and brakes are engaged or activated to provide a sequence of numerically related gear ratios and thus speed and torque ratios.

Because they so closely match the power and torque curves of the engine to the vehicle speed and load, such six, seven and eight speed transmissions provide significant performance enhancements and fuel consumption reduction.

Careful study of these transmission configurations, however, reveals that improvements are both possible and desirable. For example, each of the torque transmitting devices, i.e., the clutches and brakes, contribute to frictional losses, referred to as spin losses, when they are not engaged. Two primary factors influence spin losses: the size or torque capacity of the clutch and the instantaneous speed difference across the clutch. A particularly disadvantageous condition arises if the device is a high torque capacity, multiple plate clutch functioning as a brake with a high speed difference across it. Since a brake typically has one half of its friction members connected to ground which are therefore always stationary, the spin losses in such a situation may be relatively significant.

The present invention is directed to reducing frictional or spin losses created by the clutches and brakes of a multiple speed automatic transmission.

SUMMARY

A multiple speed automatic transmission is provided having an input member, an output member, a plurality of planetary gear sets, a plurality of interconnecting members and a plurality of torque transmitting devices. The input member is connected to and drives a planet gear carrier of a first planetary gear set. The output member is connected to and is driven by a planet gear carrier of the third planetary gear set. A first interconnecting member connects a sun gear of the first planetary gear set with a sun gear of the fourth planetary gear set. A second interconnecting member connects a planet gear carrier of the fourth planetary gear set with a ring gear of the third planetary gear set. A third interconnecting member connects a ring gear of the first planetary gear set with a sun gear of the second planetary gear set. A fourth interconnecting member connects a planet gear carrier of the third planetary gear set with a planet gear carrier of the second planetary gear set.

The plurality of torque transmitting devices including two brakes and three clutches are selectively engageable in various combinations of three to establish eight forward gear ratios and one reverse gear ratio between the input member and the output member. A first brake selectively connects the sun gear of the fourth planetary gear set with a stationary member. A second compound brake selectively connects a ring gear of the fourth planetary gear set with the stationary member. The second compound brake includes a selectable one way clutch and a light duty or coast clutch disposed in mechanical parallel. Preferably, the light duty clutch includes a single rotating disc or plate. A first clutch selectively connects the planet gear carrier of the first planetary gear set with a sun gear of the third planetary gear set. A second clutch selectively connects the sun gear of the second planetary gear set with the sun gear of the third planetary gear set. A third clutch selectively connects a ring gear of the second planetary gear set with the sun gear of the third planetary gear set.

A multiple speed automatic transmission incorporating the present invention exhibits significantly reduced frictional, i.e., spin losses.

Thus it is an object of the present invention to provide a multiple speed automatic transmission having four planetary gear sets and five selectable torque transmitting devices.

It is a further object of the present invention to provide a multiple speed automatic transmission having a compound brake including a selectable one way clutch.

It is a further object of the present invention to provide a multiple speed automatic transmission having a compound brake including a selectable one way clutch and a light duty or coast clutch in parallel.

It is a still further object of the present invention to provide a multiple speed automatic transmission exhibiting reduced spin losses.

The above features and advantages and other features and advantages of the present invention will be readily apparent from the following detailed description of the preferred embodiment for carrying out the invention when taken in connection with the accompanying drawings.

DESCRIPTION OF THE PREFERRED EMBODIMENT

Figure 1:
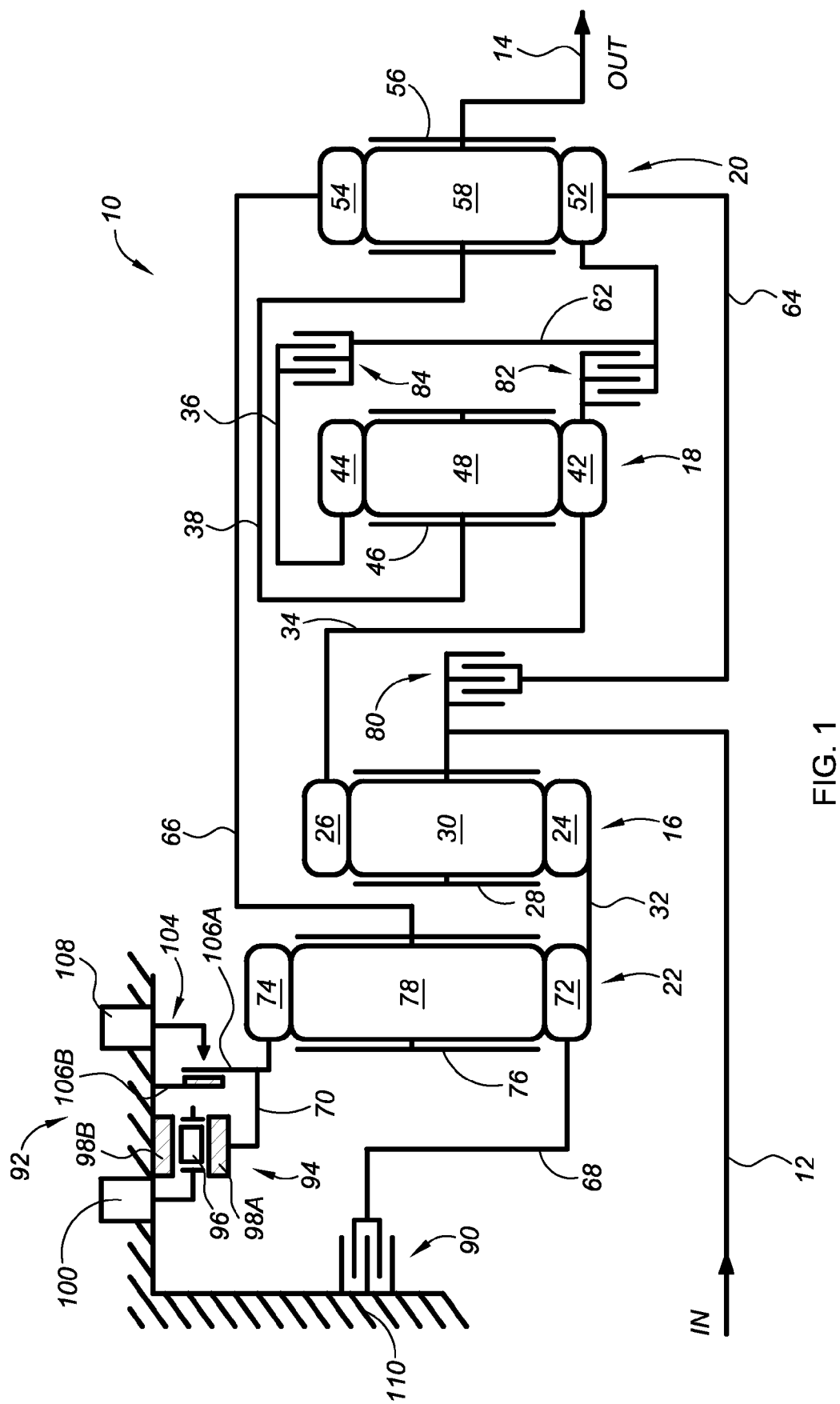
FIG. 1 is a schematic representation of an embodiment of an automatic transmission in accordance with the present invention.

Referring to the drawings, wherein like reference numbers refer to the same component, element or feature, in FIG. 1 a multiple speed automatic transmission 10 is depicted. The automatic transmission 10 includes an input member 12 and an output member 14. In the present embodiment, the input member 12 and the output member 14 are shafts, and will be referred to as such. Those skilled in the art will appreciate that the input member 12 and the output member 14 may be components other than shafts such as quills. The input shaft 12 is continuously connected to an engine (not shown) or to a turbine of a torque converter (not shown). The output shaft 14 is continuously connected with the final drive unit such as a differential or transfer case (both not shown).

The automatic transmission 10 includes four planetary gear sets 16, 18, 20 and 22. The planetary gear sets 16, 18, 20 and 22 are operably disposed between the input shaft 12 and the output shaft 14. In the preferred embodiment of the present invention, the first planetary gear set 16 is a simple planetary gear set that includes a first sun gear member 24, a first ring gear member 26 and a first planet carrier member 28 that rotatably supports a first plurality of pinion gears 30 (only one of which is shown). The first plurality of pinion gears 30 are configured to intermesh with the first sun gear member 24 and the first ring gear member 26. The first sun gear member 24 is connected for common rotation with a first intermediate shaft or quill 32. The first ring gear member 26 is connected for common rotation with a second intermediate shaft or quill 34. The first planet carrier member 28 is connected for common rotation with the input shaft 12.

In the preferred embodiment of the present invention, the second planetary gear set 18 is a simple planetary gear set that includes a second sun gear member 42, a second ring gear member 44 and a second planet carrier member 46 that rotatably supports a second plurality of pinion gears 48 (only one of which is shown). The second plurality of pinion gears 48 are configured to intermesh with both the second sun gear member 42 and the second ring gear member 44. The second sun gear member 42 is connected for common rotation with the second intermediate shaft or quill 34. The second ring gear member 44 is connected for common rotation with a third intermediate shaft or quill 36. The second carrier member 46 is connected for common rotation with a fourth intermediate shaft or quill 38.

In the preferred embodiment of the present invention, the third planetary gear set 20 is a simple planetary gear set that includes a third sun gear member 52, a third ring gear member 54 and a third planet carrier member 56 that rotatably supports a third plurality of pinion gears 58 (only one of which is shown). The third plurality of pinion gears 58 are configured to intermesh with both the third sun gear member 52 and the third ring gear member 54. The third sun gear member 52 is connected for common rotation with a fifth intermediate shaft or quill 62 and a sixth intermediate shaft or quill 64. The third ring gear member 54 is connected for common rotation with a seventh intermediate shaft or quill 66. The third carrier member 56 is connected for common rotation with the output shaft 14.

In the preferred embodiment of the present invention, the fourth planetary gear set 22 is a simple planetary gear set that includes a fourth sun gear member 72, a fourth ring gear member 74 and a fourth planet carrier member 76 that rotatably supports a fourth plurality of pinion gears 78 (only one of which is shown). The fourth plurality of pinion gears 78 are configured to intermesh with both the fourth sun gear member 72 and the fourth ring gear member 74. The fourth sun gear member 72 is connected for common rotation with a first outer shaft or quill 68 and the first intermediate shaft or quill 32. The fourth ring gear member 74 is connected for common rotation with a second outer shaft or quill 70. The fourth carrier member 76 is connected for common rotation with the seventh intermediate shaft or quill 66.

The automatic transmission 10 includes a variety of torque transmitting mechanisms or devices including a first intermediate clutch 80, a second intermediate clutch 82, a third intermediate clutch 84, a first brake 90 and a second, compound brake 92. The first intermediate clutch 80 is selectively engageable to connect the sixth intermediate shaft or quill 64 to the first planet carrier member 28 and the input shaft 12. The second intermediate clutch 82 is selectively engagable to connect the fifth intermediate shaft or quill 62 to the second sun gear member 42. The third intermediate clutch 84 is selectively engagable to connect the third intermediate shaft or quill 36 to the fifth intermediate shaft or quill 62. The first brake 90 is selectively engageable to connect the first outer shaft or quill 68 to a housing 110 of the automatic transmission 10 to restrict or inhibit rotation of the first outer shaft or quill 68 and the fourth sun gear member 72 relative to the housing 100.

The second, compound brake 92 is operably disposed between the second outer shaft or quill 70 which is connected to the fourth ring gear member 74 and the housing 110 of the transmission 10 and selectively restricts or inhibits rotation of the second outer shaft or quill 70 and the fourth ring gear member 74 relative to the housing 110. The second, compound brake 92 comprises a selectable one way or overrunning clutch assembly 94 having a plurality of sprags, struts or rollers 96 disposed between inner and outer members 98A and 98B. The inner member 98A is connected to the second outer shaft or quill 70 and rotates therewith. The outer member 98B is connected to the housing 110 and is therefore stationary. The selectable one way or overrunning clutch 94 reacts, i.e., carries to ground, namely, the housing 110 of the automatic transmission 10, the large torque developed within the automatic transmission 10 in reverse gear. The one way clutch assembly 94 also carries the lower torques associated with operation in first through fifth gears.

The selectable one way clutch assembly 94 also includes a first two state or two position actuator 100. In a first state or position of the first actuator 100, the one way clutch assembly 94 operates conventionally, allowing relative rotation between the inner and outer members 98A and 98B in one direction while inhibiting such rotation in the opposite direction. In the second state or position of the first actuator 100, the one way clutch assembly 94 is fully locked and relative rotation between the members 98A and 98B in either direction is prohibited. The first actuator 100 is energized or engaged, i.e., placed in the second state or position, which locks up the one way or overrunning clutch assembly 94 in accordance with the truth table presented in FIG. 2, described below. The first actuator 100 may be any suitable device such as, for example, an electrically driven motor and gear reduction assembly, a solenoid or a hydraulically or pneumatically powered piston and cylinder assembly.

It should be appreciated that the inventor is familiar with the convention of characterizing a torque controlling or transferring device disposed between two rotatable members as a clutch whereas such a device disposed between one rotatable member and one fixed or stationary member is characterized as a brake. Nonetheless, the one way or overrunning device described above is characterized as a clutch rather than a brake as the inventor is unaware of any instance in which such a device utilized as a brake is referred to or characterized as a one way or overrunning brake rather than a one way or overrunning clutch.

The second, compound brake 92 also includes an auxiliary or coast plate clutch or brake 104 disposed in mechanical parallel with the one way or overrunning clutch assembly 94. The coast plate clutch or brake 104 is a brake having a torque capacity lower than what would be required in this location and application in the automatic transmission 10 if the one way or overrunning clutch assembly 94 were not present. This limited or low torque capability is sufficient because the one way or overrunning clutch assembly 94 carries the reaction torque between the fourth ring gear 74 and the transmission housing 110 during most operating modes. As such, the auxiliary or coast plate clutch or brake 104 may include a single clutch plate or disc 106A adjacent a single stationary plate or disc 106B, one of which includes friction material or facing. While such a single plate or disc configuration will typically provide the lowest frictional or spin losses when the auxiliary or coast plate brake 104 is disengaged and is therefore preferred, it should be appreciated that other clutch or brake configurations having multiple plates or discs are within the scope of the present invention. The auxiliary or coast plate brake 104 also includes a second two state or position actuator 108 which engages the auxiliary or coast plate brake 104 and transfers limited torque from the fourth ring gear member 74 and the second outer shaft or quill 70 to the transmission housing 110. This operating state is utilized to react coast torque in first through fifth gears when needed.

It should be appreciated that while the second, compound brake 92 has been described in a particular location within the automatic transmission 10, i.e., operably disposed between the fourth ring gear member 74 of the fourth planetary gear set 22 and the housing 110 of the automatic transmission 10, the compound brake 92 according to the present invention may replace or be substituted for other clutches or brakes in other locations in this automatic transmission 10 or other multiple speed, planetary gear set automatic transmissions in order to provide the benefit of reduced frictional or spin losses.

For example, in an alternate embodiment eight speed transmission, four simple planetary gear sets may be arranged with the input connected to the planet carrier of a second planetary gear set, the output may be connected to a planet carrier of a fourth planetary gear set and permanent couplings may be established between a ring gear of a first planetary gear set and a sun gear of a fourth planetary gear set, a sun gear of the first planetary gear set and a ring gear of the second planetary gear set, a sun gear of the second planetary gear set and a sun gear of a third planetary gear set and a planet carrier of the third planetary gear set and a ring gear of the fourth planetary gear set. Three selectively engageable clutches may be operably disposed between a planet carrier of the first planetary gear set and the planet carrier of the fourth planetary gear set, the ring gear of the first planetary gear set and the sun gear of the first planetary gear set and the ring gear of the first planetary gear set and the input shaft. A first brake may selectively ground the sun gear of the second planetary gear set and the sun gear of the third planetary gear set. A second, compound brake according to the present invention may be utilized in this transmission configuration between a ring gear of the third planetary gear set and ground to provide overrunning action in one direction of relative rotation and inhibited rotation in the opposite direction when not activated or energized, lockup in both directions when energized, for example, when selecting reverse gear. The auxiliary or coast clutch may be activated to provide engine braking in accordance with desired performance criteria.

Figures 2, 3:
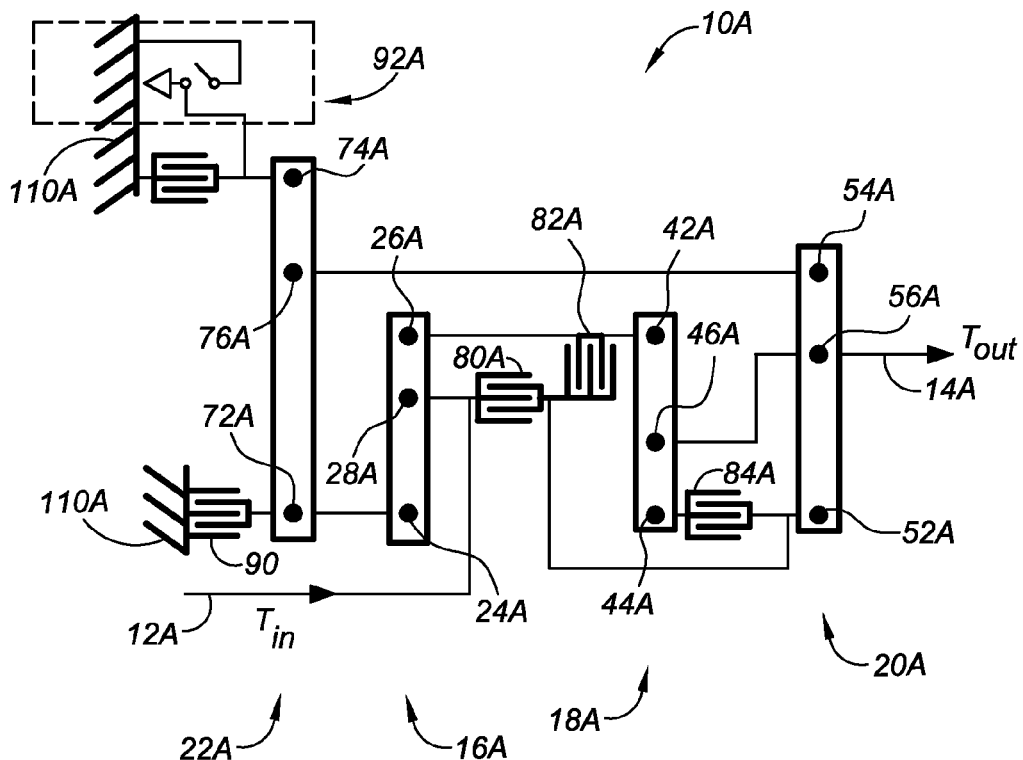
FIG. 2 is a truth table listing the engaged torque transmitting devices for selected torque or gear ratios achieved by the automatic transmission of FIG. 1.
FIG. 3 is a lever diagram of the automatic transmission of FIG. 1 illustrating the power flow from the input through the planetary gear sets to the output, in accordance with the present invention.

The transmission 10 is capable of transmitting torque from the input shaft 12 to the output shaft 14 in at least eight forward torque, gear or speed ratios and one reverse torque, gear or speed ratio as indicated in the truth table of FIG. 2. Each of the forward and reverse torque, gear or speed ratios is attained by engagement of various combinations of the torque transmitting devices, i.e. the first intermediate clutch 80, the second intermediate clutch 82, the third intermediate clutch 84, the first brake 90 and the second, compound brake 92. Thus, at least eight forward gear or speed ratios and at least one reverse gear or speed ratio may be attained by the automatic transmission 10. An example of the gear ratios that may be obtained using the present invention are also shown in FIG. 2. Of course, other gear ratios are achievable depending on the gear diameter, gear tooth count and gear configuration selected.

A lever diagram 10A is shown in FIG. 3 that is representative of the automatic transmission 10 of FIG. 1, as well as the connections for the clutches 80, 82, 84 and the brakes 90, 92. The nodes 24A, 26A, 28A, 42A, 44A, 46A, 52A, 54A, 56A, 72A, 74A and 76A of the lever diagram 10A represent the gear members 24, 26, 28, 42, 44, 46, 52, 54, 56, 72, 74 and 76 of FIG. 1 such that the same numerical designation with the addition of an A suffix is used to identify the corresponding node. For example, the nodes 24A and 42A shown in FIG. 3 represent the first and second sun gear members 24 and 42, respectively, shown in FIG. 1. Other components of FIG. 3 have the same numbering convention for the corresponding components in FIG. 1.

The operation or engagement of the clutches 80, 82 and 84 and the brakes 90 and 92 to establish the various forward and reverse speed or gear ratios will now be described with continuing reference to FIGS. 1 and 2.

To establish the reverse gear ratio (Rev), the torque transmitting clutches and brakes are engaged or activated as set forth in the truth table of FIG. 2. As shown in FIG. 2, the first brake 90, the actuator 100 of the one way or overrunning clutch assembly 94 of the second compound brake 92 and the third intermediate clutch 84 are engaged to achieve the reverse gear ratio (Rev). As noted previously when the second, compound brake 92 is engaged or activated, the actuator 100 is in its second state which locks the one way or overrunning clutch assembly 94 and locks or inhibits rotation of the second outer shaft or quill 70 and the fourth ring gear member 74 in both directions.

In neutral, none of the clutches or brakes are carrying torque. As indicated by the O in FIG. 2, in this gear state, the first brake 90 and the second, compound brake 92 are engaged but not carrying torque.

A first forward gear ratio, indicated as 1st (first gear) in the truth table of FIG. 2, is achieved by engaging the first brake 90, the second, compound brake 92 and the first intermediate clutch 80. It should be understood that although the truth table of FIG. 2 indicates that the second, compound brake 92 is engaged or activated, such activation is optional in first through fifth gears as the overrunning feature of the one way or overrunning clutch assembly 94 will provide the appropriate and necessary mechanical connection and operation.

The next forward gear ratio, indicated as $2^{nd}$ (second gear) in FIG. 2, is established by engagement of the first brake 90, the second intermediate clutch 82 and optional engagement of the second, compound brake 92. The shift from first gear to second gear occurs as follows: releasing the first intermediate clutch 80 and engaging the second intermediate clutch 82 while maintaining engagement of the brakes 90 and 92.

The next gear ratio, indicated as $3^{rd}$ (third gear) in the truth table of FIG. 2, is established by optional engagement of the second, compound brake 92 and engagement of the first and second intermediate clutches 80 and 82. The shift from second gear to third gear occurs as follows: the second clutch 82 and the second, compound brake 92 remain engaged, the first brake 90 is released and the first clutch 80 is engaged.

The next forward gear ratio, indicated as $4^{th}$ (fourth gear) in the truth table of FIG. 2, is established by optional engagement of the second, compound brake 92 and engagement of the second and third intermediate clutches 82 and 84. The shift from third gear to fourth gear is achieved as follows: engagement of the second clutch 82 and the second brake 92 are maintained, the first clutch 80 is released and the third clutch 84 is engaged.

The next forward gear ratio indicated as $5^{th}$ (fifth gear) in FIG. 2, is established by optional engagement of the second, compound brake 92 and engagement of the first and third intermediate clutches 80 and 84. The shift from fourth gear to fifth gear occurs as follows: engagement of the third clutch 84 and the second brake 92 are maintained, the second clutch 82 is released and the first clutch 80 is engaged.

The next forward gear ratio indicated as $6^{th}$ (sixth gear), in the truth table of FIG. 2, is established with the engagement of the first, second and third intermediate clutches 80, 82 and 84. The shift from fifth gear to sixth gear occurs as follows: engagement of the clutches 80 and 84 is maintained, the second, compound brake 92, if engaged, is released and the third clutch 82 is engaged.

The next gear ratio, indicated as $7^{th}$ (seventh gear) in the truth table of FIG. 2, is established by engagement of the first brake 90 and the first and third intermediate clutches 80, 84. The shift from sixth gear to seventh gear occurs as follows: engagement of the clutches 80 and 84 is maintained, the second clutch 82 is released and the first brake 90 is engaged.

The final forward gear ratio, indicated as $8^{th}$ (eight gear) in the truth table of FIG. 2, is established by engagement of the first brake 90 and the second and third intermediate clutches 82, 84. The shift from seventh gear to eighth gear occurs as follows: engagement of the third clutch 84 and the first brake 90 are maintained, the first clutch 80 is released and the second clutch 82 is engaged.

The present invention contemplates that downshifts follow the reverse sequence of the corresponding upshifts (as described above), and several power-on skip-shifts that are single-transition shifts are possible, e.g. from 1st to 3rd.

While the best mode for carrying out the invention has been described in detail, those familiar with the art to which this invention relates will recognize various alternative designs and embodiments for practicing the invention within the scope of the appended claims.

What is claimed is:

1. A multiple speed automatic transmission comprising, in combination,
   an input member,
   an output member,
   first, second, third and fourth planetary gear assemblies each having a sun member, a ring member and a planet carrier member,
   said input member coupled to said planet carrier member of said first planetary gear assembly, said output member coupled to said planet carrier member of said third planetary gear assembly,
   a first member coupling said sun member of said first planetary gear assembly to said sun member of said fourth planetary gear assembly,
   a second member coupling said planet carrier member of said fourth planetary gear assembly to said ring member of said third planetary gear assembly,
   a third member coupling said ring gear of said first planetary gear assembly to said sun member of said second planetary gear assembly,
   a fourth member coupling said planet carrier member of said third planetary gear assembly to said planet carrier member of said second planetary gear assembly,
   a first brake selectively connecting said sun member of said fourth planetary gear assembly to ground,
   a second brake selectively connecting said ring member of said fourth planetary gear assembly to ground, wherein said second brake is compound,
   a first clutch selectively connecting said planet carrier member of said first planetary gear assembly to said sun member of said third planetary gear assembly,
   a second clutch selectively connecting said sun member of said second planetary gear assembly to said sun member of said third planetary gear assembly, and
   a third clutch selectively connecting said ring member of said second planetary gear assembly to said sun member of said third planetary gear assembly.

2. The multiple speed automatic transmission of claim 1 wherein said second brake includes a one way clutch and a clutch in mechanical parallel.

3. The multiple speed automatic transmission of claim 1 wherein said input member and said output member are shafts.

4. The multiple speed automatic transmission of claim 3 wherein each of said planet carrier members includes a plurality of planet gears.

5. The multiple speed automatic transmission of claim 1 wherein said clutches include interleaved pluralities of friction discs.

6. The multiple speed automatic transmission of claim 1 wherein said ground is a transmission housing.

7. A multiple speed automatic transmission comprising, in combination,
   an input member,
   an output member,
   first, second, third and fourth planetary gear assemblies each having a sun gear, a ring gear and a planet carrier including a plurality of planet gears, said input member coupled to said planet carrier of said first planetary gear assembly, said output member coupled to said planet carrier of said third planetary gear assembly,
   a first member coupling said sun gear of said first planetary gear assembly to said sun gear of said fourth planetary gear assembly,
   a second member coupling said planet carrier of said fourth planetary gear assembly to said ring gear of said third planetary gear assembly,
   a third member coupling said ring gear of said first planetary gear assembly to said sun gear of said second planetary gear assembly,
   a fourth member coupling said planet carrier of said third planetary gear assembly to said planet carrier of said second planetary gear assembly,
   a first brake selectively connecting said sun gear of said fourth planetary gear assembly to ground,
   a second brake selectively connecting said ring gear of said fourth planetary gear assembly to ground, wherein said second brake is compound,
   a first clutch selectively connecting said planet carrier of said first planetary gear assembly to said sun gear of said third planetary gear assembly,
   a second clutch selectively connecting said sun gear of said second planetary gear assembly to said sun gear of said third planetary gear assembly, and a third clutch selectively connecting said ring gear of said second planetary gear assembly to said sun gear of said third planetary gear assembly.

8. The multiple speed automatic transmission of claim 7 wherein said second brake includes a one way clutch and a clutch in mechanical parallel.

9. The multiple speed automatic transmission of claim 8 wherein said input member and said output member are shafts.

10. The multiple speed automatic transmission of claim 7 wherein each of said planet carriers includes at least three planet gears.

11. The multiple speed automatic transmission of claim 7 wherein said clutches include interleaved pluralities of friction discs.

12. The multiple speed automatic transmission of claim 7 wherein said ground is a transmission housing.

13. A multiple speed automatic transmission comprising, in combination,
    an input shaft,
    an output shaft,
    first, second, third and fourth planetary gear assemblies each having a sun gear, a ring gear and a planet carrier including a plurality of planet gears,
    said input shaft coupled to said planet carrier of said first planetary gear assembly, said output shaft coupled to said planet carrier of said third planetary gear assembly,
    a first member coupling said sun gear of said first planetary gear assembly to said sun gear of said fourth planetary gear assembly,
    a second member coupling said planet carrier of said fourth planetary gear assembly to said ring gear of said third planetary gear assembly,
    a third member coupling said ring gear of said first planetary gear assembly to said sun gear of said second planetary gear assembly,
    a fourth member coupling said planet carrier of said third planetary gear assembly to said planet carrier of said second planetary gear assembly,
    a first brake selectively connecting said sun gear of said fourth planetary gear assembly to ground,
    a compound brake selectively connecting said ring gear of said fourth planetary gear assembly to ground, wherein said compound brake includes a one way clutch and a clutch in mechanical parallel,
    a first clutch selectively connecting said planet carrier of said first planetary gear assembly to said sun gear of said third planetary gear assembly,
    a second clutch selectively connecting said sun gear of said second planetary gear assembly to said sun gear of said third planetary gear assembly, and
    a third clutch selectively connecting said ring gear of said second planetary gear assembly to said sun gear of said third planetary gear assembly.

* * * * *